P. W. KIEFER

Nov. 15, 1932. CAST METAL HOPPER FOR RAILWAY CARS Re. 18,656

2 Sheets-Sheet 1

Original Filed Jan. 27, 1930

Inventor:
Paul W. Kiefer
Clinton E. Sisson
Attorney

P. W. KIEFER

Nov. 15, 1932. CAST METAL HOPPER FOR RAILWAY CARS Re. 18,656

2 Sheets-Sheet 2

Original Filed Jan. 27, 1930

Inventor:
Paul W. Kiefer
Clinton E. Sisson
Attorney

Reissued Nov. 15, 1932 Re. 18,656

UNITED STATES PATENT OFFICE

PAUL W. KIEFER, OF NEW YORK, N. Y., ASSIGNOR OF ONE-HALF TO EDWIN P. MOSES, OF WHITE PLAINS, NEW YORK

CAST METAL HOPPER FOR RAILWAY CARS

Original No. 1,841,480, dated January 19, 1932, Serial No. 423,814, filed January 27, 1930. Application for reissue filed August 6, 1932. Serial No. 627,803.

By nature of their requirements railway freight train cars are out of doors substantially all of the time, therefore, are subjected to corrosive action of the elements, and while paint and other non-corrosive coatings have been applied to the car parts, such protection not only has been found to be expensive in time and money, but the lading removes the coating. This is particularly true of the inside of open type cars which are turned upside down in unloading machines causing the load to slide across the inside surface of the car body and also when the discharging load slides across the surface of a drop door and also when the long lading rests upon the lowered drop end gate of a gondola car the friction therebetween caused by the movement of the car also removes the protective coating from the end gate. Furthermore, certain ladings, such as sulphur, wet coal, which forms sulphuric acid, and saline water (in refrigerator and stock cars) cause rolled steel to corrode. On account of its increased strength rolled steel in the form of plates and bars has supplanted wood in car construction but the corrosive action of the elements eats away the rolled steel material reducing its strength and its length of life. This applies to both the load carrying members, such as the sills, plates and diaphragms and also to the lading retaining members, such as side and end walls, floors, hoppers, hopper doors, etc. It has been found that cast metal, particularly cast steel, has more than twice the resistance to corrosion than rolled steel, therefore, I preferably make the car part of cast metal to enable the car part to resist corrosion, and furthermore, to produce a construction wherein the metal can be disposed and positioned to accommodate the stresses set up by the car in service. Such a cast construction necessitates a minimum amount of material for strength requirements.

Another object is to eliminate the cost and delay in fabricating in the field the numerous component parts of the present structural steel car parts.

Another object of forming the car part of unitary metal is to eliminate the possibility of loose connections which would permit relative motion between the component parts of the car part, as it is common knowledge that the vibration of the car in motion, due to rough and uneven track, and metal wheels rolling on steel rails, together with longer trains and high speeds in present day practice, cause riveted joints and built up sections to work loose and the railroads look with favor upon any device which reduces the number of parts and joints, as these are the weak parts of the car and the more such weak parts are eliminated, the longer the life of the car.

Another object of the invention is to provide an integral hopper which can be installed in a railway car as a unit.

Another object of the invention is to obtain a close fit between the door and the frame surrounding the door opening by providing an integral one piece frame which is also preferably provided with a rabbet.

The objects of this invention may be attained by forming the component parts of the device of separate pieces and welding them integrally together, such pieces preferably being of relatively non-corrosive material, such as copper bearing steel or wrought iron plates.

Figure 1:
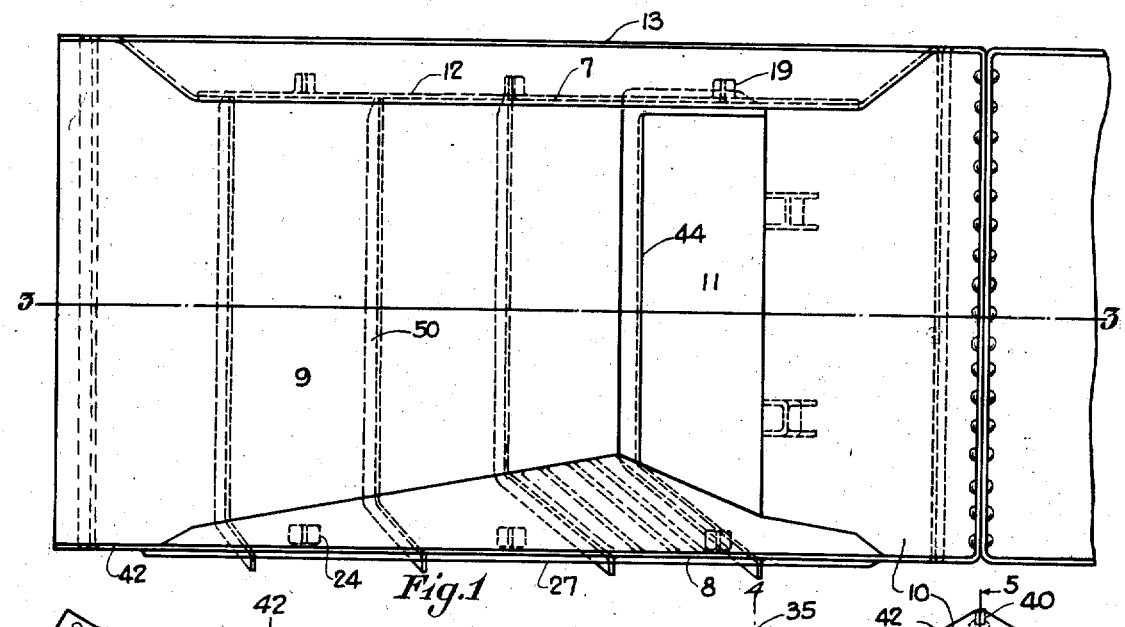
Figs. 1 and 2 show a plan and elevation respectively of a typical hopper according to my invention.
Figure 2:
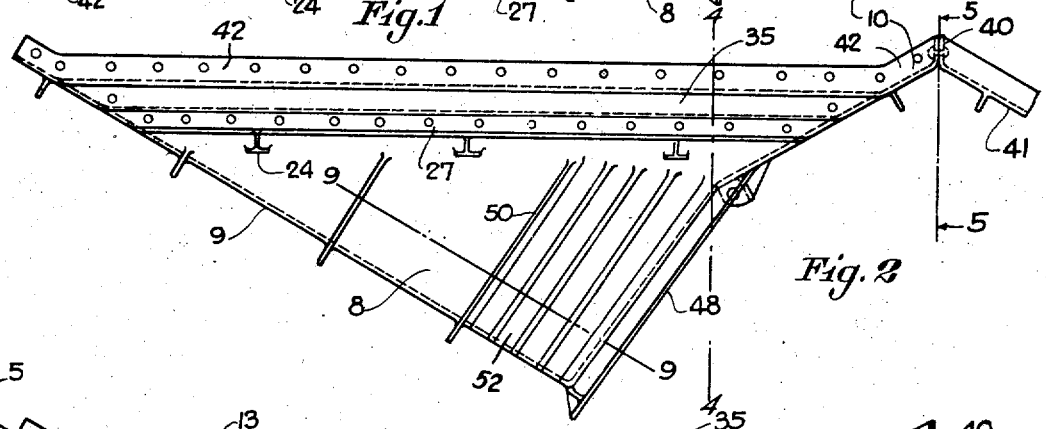
Figure 3:
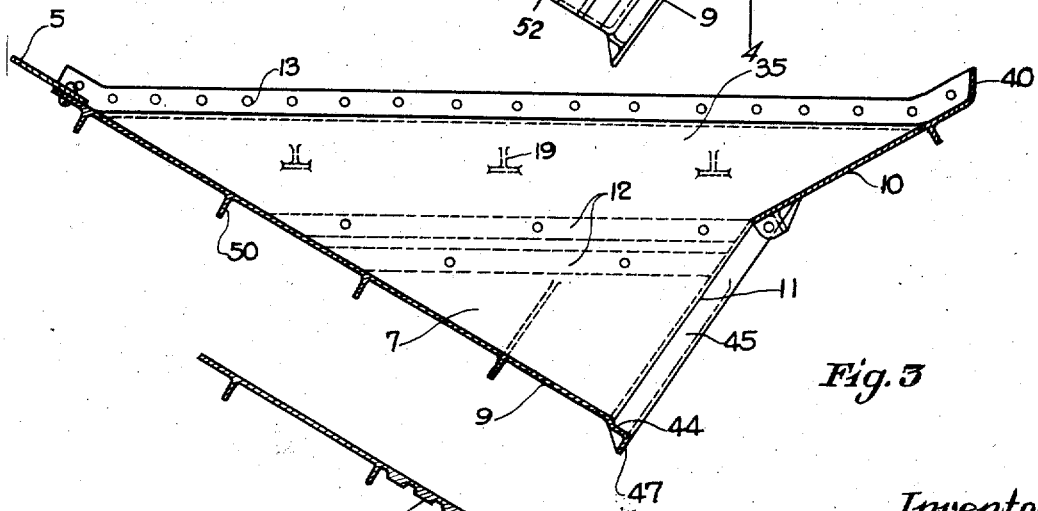
Fig. 3 is a section on line 3—3 of Fig. 1.
Figure 4:
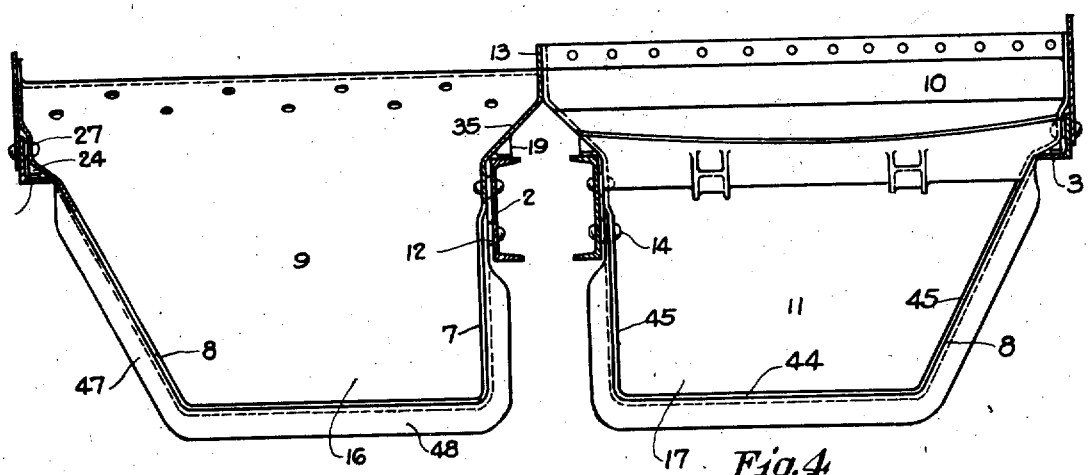

Fig. 4 on the left half shows a section on line 4—4 of Fig. 2 and on the right half shows an end view of the hopper on line 5—5 of Fig. 2.

Figure 5:
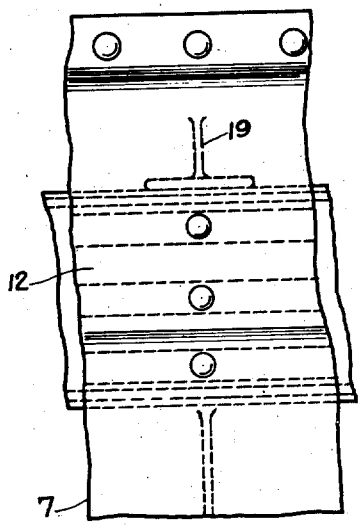
Figure 6:
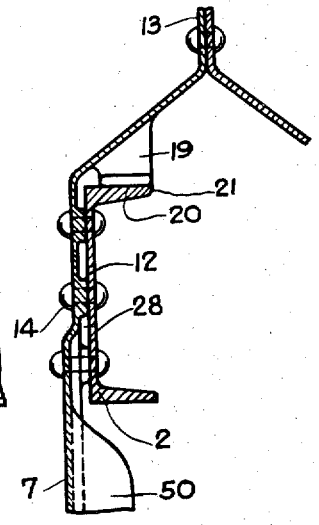

Figs. 5 and 6 show the attachment of the hopper to the center sill.

Figure 8:
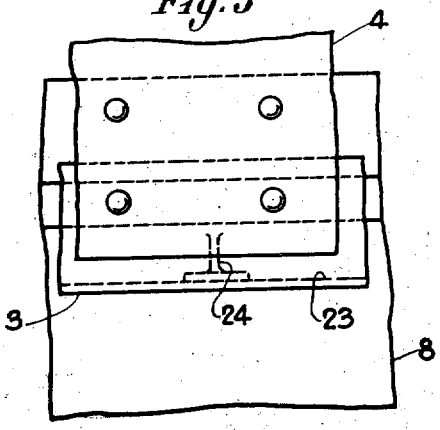
Figure 7:
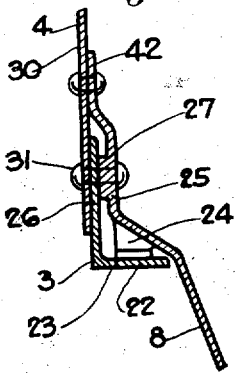

Figs. 7 and 8 show the attachment of the hopper to the side sill.

Figure 9:
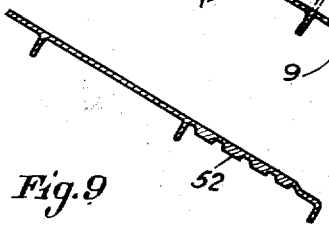

Fig. 9 is a section on line 9—9 of Fig. 2.

The usual parts of the car are shown, such as center sills 2; side sills 3; side walls 4 and sloping floor sheets 5.

The hopper illustrated comprises an inner wall 7; an outer wall 8; a sloping floor 9; a sloping cross ridge 10 and a door opening 11.

The inner wall 7 is preferably substantially vertical and is positioned adjacent the outside of the center sill 2, but is spaced apart therefrom and provided with chipping pads 12 so that when the upright flanges 13 on the opposite hoppers are riveted together the distance between the side sill 2 and the vertical wall 7 can be adjusted by chipping or grinding off the chipping pads. The rivets 14 securing the vertical wall to the center sill preferably extend through these chipping pads 12, as shown in Fig. 6. By this arrangement, a snug and tight fit is secured between the center sill 2 and the two hoppers (16—17) so that the tendency of the service movements of the car to loosen the connections between these elements is materially reduced.

The hopper is also preferably provided with supporting brackets 19 having substantially horizontal lower bearing surfaces which rest upon a horizontal portion 20 of the center sill 2. In the form illustrated the brackets rest upon the top flange 21 of the center sill channels so that the load of the hopper and its lading is supported by the brackets 19 and not primarily by the rivets. Of course, the rivets cooperate to support a part of the load. I preferably do not fasten the brackets 19 to the center sills so that as the rivets 14 connecting the hopper to the vertical wall 28 are drawn tight the brackets merely slide over the horizontal surface of the center sill.

The attachment and support of the outer wall 8 of the hopper to the side sill 3 (or side wall 4) of the car is similar in function to that described for the attachment and support of the hopper to the center sill 2. In the form illustrated (see Figs. 7 and 8) the side sill 3 comprises an angle having an inwardly projecting flange 22 providing a horizontal surface 23 upon which the bracket 24 rests and the upwardly extending flange 25 of the hopper is spaced apart from the vertical flange 26 of the side sill and provided with chipping pads 27. The side wall sheet 30 is attached to the side sill 3 and also the hopper by the rivets 31.

The inner wall 7 of the hopper is extended to form a cover 35 for the center sill 2 which is positioned obliquely and merges into an upwardly extending flange 13 which is secured to the companion flange on the other hopper thus forming a protection for the rolled steel center sills against the falling lading and corrosion and also providing a substantially unitary construction between the hoppers on opposite sides of the center sill construction. The sloping floor sheet 5 of the car is secured to the floor 9 of the hopper.

The cross ridge 10 is provided with an upwardly extending flange 40 which is secured to the companion flange of the adjacent hopper. This cross ridge is also provided with a continuation of flange 42 secured to the side wall 4 of the car.

The inner wall 7; the outer wall 8; the floor 9 and the cross ridge 10 provide a frame for the door opening and as these members are integrally formed a very rigid door frame is provided. I preferably provide the lower and side portions of the door opening with a rabbet (44—45) for reception of the door.

I also provide an outwardly extending flange 47—48 adjacent the door opening to further stiffen the hopper adjacent the door opening.

The hopper is reinforced by a plurality of ribs 50 extending outwardly from the inner wall 7; outer wall 8 and floor 9 and terminating adjacent the center sill 2 and side sill 3, respectively.

It is customary to pound the outer wall 8 of a hopper with sledges to loosen the load when it has become compact by the constant motion of the car in service or has frozen. Such sledging distorts, breaks and otherwise damages the hopper and therefore to protect the hopper I cast integral therewith a plurality of preferably parallel ribs 52 which extend from adjacent the hopper floor 9 to adjacent the side sill 3 of the car, as shown in Figs. 2 and 9.

Any convenient form of door or door operating or locking mechanism may be used with my hopper.

The accompanying drawings illustrate the preferred form of the invention, though it is to be understood that the invention is not limited to the exact details of construction shown and described, as it is obvious that various modifications thereof, within the scope of the claims, will occur to persons skilled in the art.

I claim:

1. In a railway car, the combination of a center sill having a substantially horizontal portion, and a unitary metal hopper comprising an inside wall provided with spaced apart supporting brackets resting upon said horizontal portion.

2. In a railway car, the combination of a center sill having a substantially horizontal portion, a side sill having a substantially horizontal portion, and a unitary metal hopper comprising an inside wall and an outside wall, each provided with supporting brackets resting upon said horizontal portions of the center and side sill respectively.

3. In a railway car, the combination of a center sill having a substantially horizontal portion and a substantially vertical portion, and a unitary metal hopper comprising an inside wall provided with suporting brackets resting upon said horizontal portion and provided with chipping pads engaging said vertical portions.

4. In a railway car, the combination of a center sill having a substantially horizontal portion and a substantially vertical portion, a side sill having a substantially horizontal portion and a substantially vertical portion, and a unitary metal hopper comprising an inside wall and an outside wall, each provided with supporting brackets resting upon said horizontal portions of the center and side sill, respectively, and provided with chipping pads engaging said vertical portions of the center sill and side sill respectively.

5. In a railway car, the combination of a center sill having a substantially horizontal portion, and a unitary metal hopper comprising a substantially vertical inside wall merging into center sill covers, said covers provided with supporting brackets resting upon said horizontal portions.

6. In a railway car, the combination of a unitary metal hopper comprising an inside wall provided with supporting brackets having substantially horizontal lower bearing surfaces.

7. In a railway car, the combination of a unitary metal hopper comprising an inside wall and an outside wall, each provided with supporting brackets having substantially horizontal lower bearing surfaces.

8. In a railway car, the combination of a unitary metal hopper comprising a substantially vertical inside wall provided with supporting brackets and provided with chipping pads.

9. In a railway car having a center sill and a side sill, a hopper consisting of one piece, comprising opposite side walls and a sloping floor, said hopper resting upon substantially horizontal portions of said sills.

10. In a railway car, the combination of spaced apart sills, each having a substantially vertical portion, and a hopper positioned outside of each sill, each hopper comprising a substantially vertical wall, a sloping sill cover, and means securing the adjacent sill cover portions together, said vertical wall having integral means to adjust the distance between the sill and the wall.

11. In a railway car, the combination of spaced apart sills, each having a substantially vertical portion, and a substantially horizontal part, and a hopper positioned outside of each sill, each hopper comprising a substantially vertical wall, a sloping sill cover, and means securing the adjacent sill cover portions together, said vertical wall having integral means to adjust the distance between the sill and the wall, said sloping cover having a bracket resting upon said horizontal part of the sill.

12. A cast metal hopper for a railway car comprising a wall provided with a plurality of parallel ribs to protect said wall when pounded to loosen the load.

13. In a railway car, the combination of a car structural member having a substantially vertical portion and a substantially horizontal part, and a hopper having integral means to adjust the distance between the hopper and the member and having a bracket resting upon said horizontal part of the member.

14. In a railway car, the combination of a unitary metal hopper having an integral portion resting upon a car part adjacent the side wall thereof whereby the weight of the hopper is primarily supported by said car part.

15. In a railway car, the combination of a unitary metal hopper having integral portions resting upon car parts adjacent the side wall and center construction thereof respectively whereby the weight of the hopper is primarily supported by said car parts.

16. A hopper adapted to be applied to a railway car provided with spaced apart brackets adapted to rest upon substantially horizontal portions of the car body so as to support the hopper.

17. A hopper adapted to be applied to a railway car provided with spaced apart brackets adapted to rest upon substantially horizontal portions of the car body so as to support the hopper, said hopper also provided with chipping pads to adjust the distance between the hopper and the car body.

PAUL W. KIEFER.